(12) United States Patent
Lingemann et al.

(10) Patent No.: US 10,807,631 B2
(45) Date of Patent: Oct. 20, 2020

(54) ADJUSTABLE STEERING COLUMN FOR A MOTOR VEHICLE

(71) Applicants: TRW Automotive GmbH, Alfdorf (DE); TRW Limited, Solihull, West Midlands (GB)

(72) Inventors: Markus Lingemann, Bochum (DE); Guido Liesenfeld, Neuss (DE); Petr Masinsky, Myslibor (CZ)

(73) Assignees: ZF Automotive Germany GmbH, Alfdorf (DE); ZF Automotive UK Limited, Solihull, West Midlands ( * ) Notice: Subject to any disclaimer, the term of this patent is extended or adjusted under 35 U.S.C. 154(b) by 0 days.

(21) Appl. No.: 15/761,135

(22) PCT Filed: Jul. 22, 2016

(86) PCT No.: PCT/EP2016/067491
§ 371 (c)(1),
(2) Date: Mar. 19, 2018

(87) PCT Pub. No.: WO2017/050460
PCT Pub. Date: Mar. 30, 2017

(65) Prior Publication Data
US 2018/0257695 A1     Sep. 13, 2018

(30) Foreign Application Priority Data

Sep. 21, 2015  (DE) .................. 10 2015 115 923

(51) Int. Cl.
*B62D 1/19* (2006.01)
*B62D 1/184* (2006.01)
*B62D 1/185* (2006.01)

(52) U.S. Cl.
CPC ............. *B62D 1/195* (2013.01); *B62D 1/184* (2013.01); *B62D 1/185* (2013.01)

(58) Field of Classification Search
CPC .......... B62D 1/184; B62D 1/185; B62D 1/19; B62D 1/192; B62D 1/195
See application file for complete search history.

(56) References Cited

U.S. PATENT DOCUMENTS 5,562,307 A    10/1996 Connor
5,820,163 A *  10/1998 Thacker ................. B62D 1/184
                                                      280/775

(Continued)

FOREIGN PATENT DOCUMENTS

DE     102010021956 A1    2/2011
DE     102010036891 A1   12/2011
JP        2015044507 A    3/2015

OTHER PUBLICATIONS

PCT International Search Report and the Written Opinion, Application No. PCT/EP2016/067491 filed Jul. 22, 2016, dated Oct. 10, 2016, Translation.

(Continued)

*Primary Examiner* — Laura Freedman
(74) *Attorney, Agent, or Firm* — Gigette M. Bejin (57) ABSTRACT

An adjustable steering column for a motor vehicle, having a console unit which is vehicle-fixed or articulated to the vehicle, a steering shaft bearing unit which is arranged in the console unit and is axially displaceable relative to the console unit, and a mechanism mounted to the console unit and provided for adjusting and fixing in place the axial length of the steering column. This mechanism, when in an open condition, enables an axial relative displacement between the console unit and the steering shaft bearing unit, and, when in a locked condition, it axially fixes the steering shaft bearing unit in place at the console unit. The steering column further has an energy absorbing unit which, in the locked condition of the mechanism for adjusting the axial length of the steering column, allows an axial displacement (Continued)

of the steering shaft bearing unit relative to the console unit, accompanied by an absorption of energy, the energy absorbing unit being mounted to the console unit.

12 Claims, 5 Drawing Sheets

(56) References Cited

U.S. PATENT DOCUMENTS

| | | | | |
|---|---|---|---|---|
| 7,278,660 B2* | 10/2007 | Ridgeway | ............... | B62D 1/181 |
| | | | | 180/271 |
| 8,403,364 B2* | 3/2013 | Monteil | ................ | B62D 1/195 |
| | | | | 280/775 |
| 8,438,944 B2* | 5/2013 | Ridgway | ................ | B62D 1/195 |
| | | | | 280/775 |
| 8,500,168 B2* | 8/2013 | Goulay | ................ | B62D 1/195 |
| | | | | 280/777 |
| 8,783,717 B2* | 7/2014 | Tinnin | ................... | B62D 1/195 |
| | | | | 280/777 |
| 8,827,311 B2* | 9/2014 | Schnitzer | ............... | B62D 1/184 |
| | | | | 188/371 |
| 8,894,097 B2* | 11/2014 | Sulser | ................... | B62D 1/184 |
| | | | | 280/777 |
| 9,233,707 B2* | 1/2016 | Domig | .................. | B62D 1/195 |
| 9,399,481 B2* | 7/2016 | Oehri | ..................... | B62D 1/184 |
| 9,428,215 B1* | 8/2016 | Nagatani | ................ | B62D 1/184 |
| 9,849,906 B2* | 12/2017 | Uesaka | .................. | B62D 1/195 |
| 10,023,222 B2* | 7/2018 | Tinnin | ................... | B62D 1/192 |
| 2005/0248141 A1 | 11/2005 | Manwaring et al. | | |
| 2008/0217901 A1 | 9/2008 | Olgren et al. | | |
| 2010/0300238 A1 | 12/2010 | Ridgway et al. | | |
| 2015/0128752 A1 | 5/2015 | Buzzard et al. | | |
| 2015/0239490 A1* | 8/2015 | Sakata | .................. | B62D 1/195 |
| | | | | 74/493 |
| 2016/0159387 A1 | 6/2016 | Okano et al. | | |

OTHER PUBLICATIONS

PCT International Search Report and the Written Opinion, Application No. PCT/EP2016/067491 filed Jul. 22, 2016, dated Oct. 10, 2016.

German Search Report, Application No. 102015115923.6, dated Apr. 27, 2016.

* cited by examiner

ADJUSTABLE STEERING COLUMN FOR A MOTOR VEHICLE

CROSS-REFERENCE TO RELATED APPLICATIONS

This application is a national stage of International Application No. PCT/EP2016/067491, filed 22 Jul. 2016, the disclosures of which are incorporated herein by reference in entirety, and which claimed priority to German Patent Application No. 10 2015 115 923.6, filed 21 Sep. 2015, the disclosures of which are incorporated herein by reference in entirety.

BACKGROUND OF THE INVENTION

The subject matter of the present invention is an adjustable steering column for a motor vehicle, in which an energy absorbing unit is mounted to the console unit of the steering column in such a way that a force transmission is effected in a form-fitting manner independently of the selected steering wheel position.

Many different embodiments of length-adjustable steering columns for motor vehicles are available in the prior art. They often include an energy absorbing unit which, in the event of a crash, particularly in the event of a rear-end collision, reduces the risk of injury to the driver in that, upon impact of the driver with the steering wheel, the latter will yield, braked by the energy absorbing unit.

U.S. Pat. No. 8,403,364 B2 shows an example thereof, where, using a lever mounted to a console unit, a pawl can be actuated which engages in a component attached to the steering shaft bearing unit and having openings for the variably adjustable steering wheel positions. This component is at the same time part of the energy absorbing unit in the form of a bending unit, so that the corresponding relative movement is braked in the event of a crash that entails a great force, transferred by means of the pawl, between the steering shaft bearing unit and the console unit.

DE 10 2010 03 689 A1 shows a further exemplary embodiment from the prior art. Here, too, an energy absorbing unit, more specifically a tab bending at break having a plurality of openings, is mounted to the steering shaft bearing unit, and a hook attached to the console unit engages in one of the openings, which simultaneously serves to adjust the length of the steering column and to transmit a force in the event of a crash.

BRIEF SUMMARY OF THE INVENTION

The invention proceeds therefrom and is directed to an adjustable steering column for a motor vehicle, which includes a console unit which is vehicle-fixed or articulated to the vehicle. Arranged in this console unit is a steering shaft bearing unit which is axially displaceable relative to the console unit for the purpose of adjusting the length of the steering column. A mechanism mounted to the console unit and provided for adjusting and fixing in place the axial length of the steering column enables an axial relative displacement between the console unit and the steering shaft bearing unit when it is in its open condition, and, when in its locked condition, it axially fixes the steering shaft bearing unit in place at the console unit. The steering column further includes an energy absorbing unit which is mounted to the console unit and remains axially fixed there when the length of the steering column is adjusted. In the locked condition of the mechanism for adjusting the axial length of the steering column, the energy absorbing unit allows an axial displacement of the steering shaft bearing unit relative to the console unit, accompanied by an absorption of energy.

As a result of the energy absorbing unit being mounted to the console unit, the number of moving parts of the steering column is advantageously reduced in comparison with the prior art, and thus the entire structure thereof is simplified. The positions of the components that are part of the console unit and which now also include the energy absorbing unit are not influenced by the length adjustment of the steering column, and both during a length adjustment of the steering column and in the event of a crash, only the absolutely necessary parts, namely the steering shaft with its bearing unit, are moved relative to the console unit and, if necessary, also slowed down.

One embodiment of the invention provides that the steering shaft bearing unit includes form-fitting elements such as, e.g., openings, and the mechanism for adjusting an axial length of the steering column includes an adjustable locking component, which in the locked condition of the mechanism for adjusting the axial length of the steering column engages in a form-fitting manner in at least one form-fitting element of the steering shaft bearing unit.

For adjusting the locking component, the mechanism for adjusting the length of the steering column may advantageously include a manually operated lever with the aid of which the locking component is adjustable between an opening position and a locking position. The movement of the locking component is effected in particular substantially radially here.

The energy absorbing unit may include an energy absorption element having a load introduction section, the energy absorption element being at least axially coupled to the locking component in the locked condition of the mechanism for adjusting the axial length of the steering column. The energy absorption element is a bending tab, for example.

The energy absorbing unit may be arranged at the console unit rigidly or else so as to swivel about a swivel axis. If it can be swiveled, the locking component may be formed in one piece with the load introduction section of the energy absorption element. This has the advantage that no further, separate component is required which needs to come into contact with the steering shaft bearing unit in order to adjust the steering wheel position.

In the case of a rigid connection, on the other hand, the load introduction section of the energy absorption element may have an opening, the locking component extending through this opening and being radially displaceably guided in the opening. Alternatively, the energy absorption element may have a stop surface, the locking component being axially adjacent to this stop surface in the locked condition of the mechanism for adjusting the axial length of the steering column and, in particular, bearing axially against the stop surface. In either case, the locking component may be releasably connected to the mechanism for adjusting the axial length of the steering column.

A further embodiment of the invention distinguishes itself in that the energy absorbing unit includes an end stop for the energy absorption element, the end stop, in the locked condition of the mechanism for adjusting an axial length of the steering column, limiting an axial distance that is covered by the load introduction section and, along with it, by the steering shaft bearing unit in the event of a crash. Furthermore, the console unit may also include an end stop for the axial movement of the steering shaft bearing unit, the end stop, in the locked condition of the mechanism for adjusting an axial length of the steering column, limiting the axial distance that is covered by the load introduction section and, along with it, by the steering shaft bearing unit.

Advantageously, provision may also be made for a safety mechanism which permits the driving operation of the motor vehicle only in the locked condition of the mechanism for adjusting the axial length of the steering column, and/or for a supplementary arrangement for swiveling the steering column.

Other advantages of this invention will become apparent to those skilled in the art from the following detailed description of the preferred embodiments, when read in light of the accompanying drawings.

DETAILED DESCRIPTION OF THE INVENTION

Figure 1:
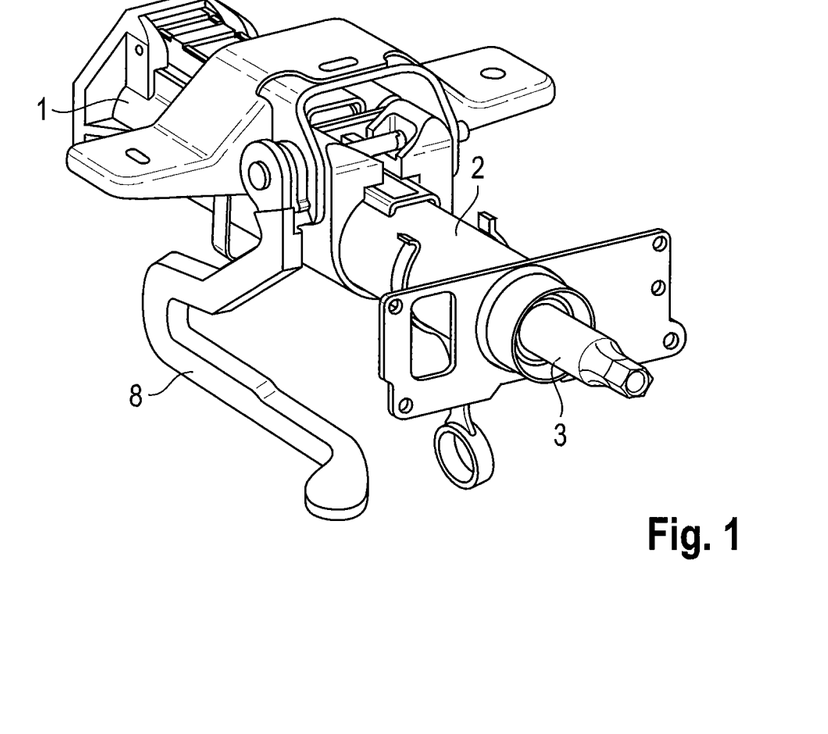
FIG. 1 shows the view of a first exemplary embodiment of an adjustable steering column for a motor vehicle according to the invention.
Figure 2:
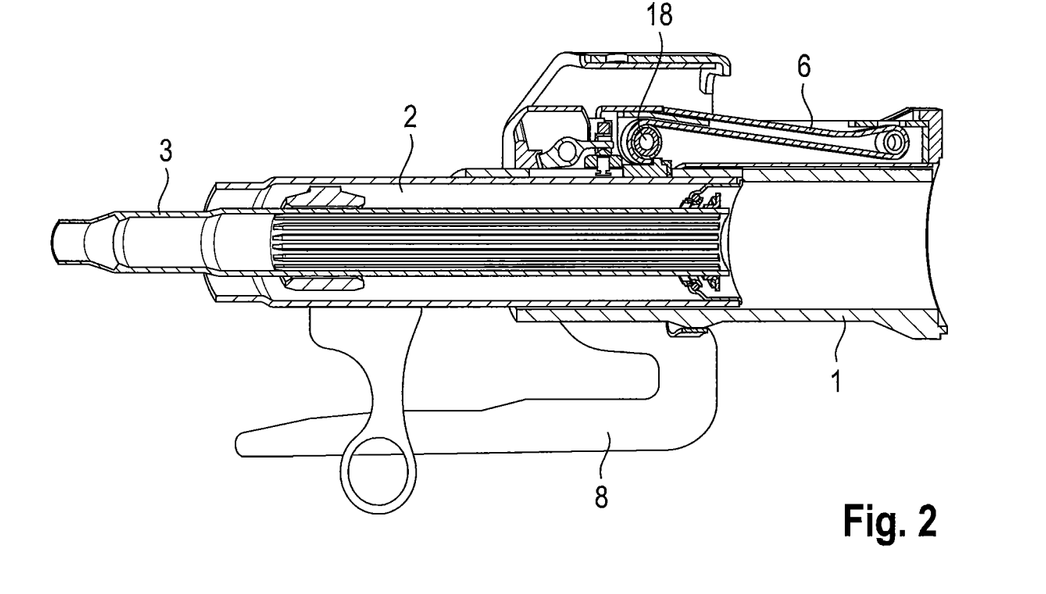
FIG. 2 shows a longitudinal section taken through the steering column according to FIG. 1.
Figure 3A:
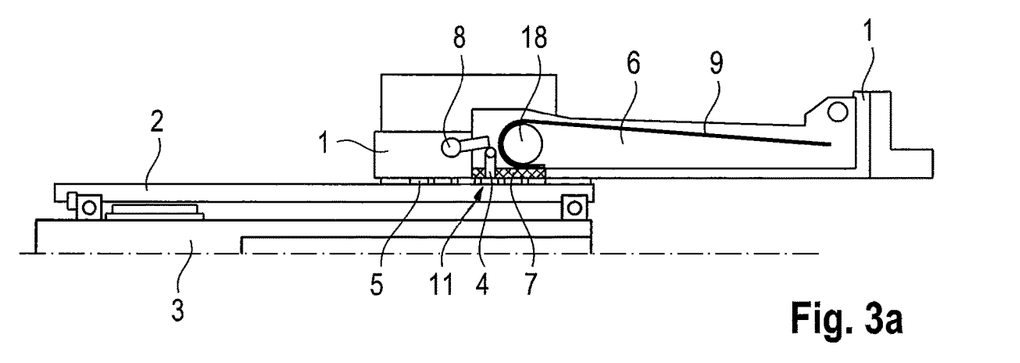
FIGS. 3a to 3c show schematic diagrams relating to the exemplary embodiment according to FIG. 1.
Figure 3B:
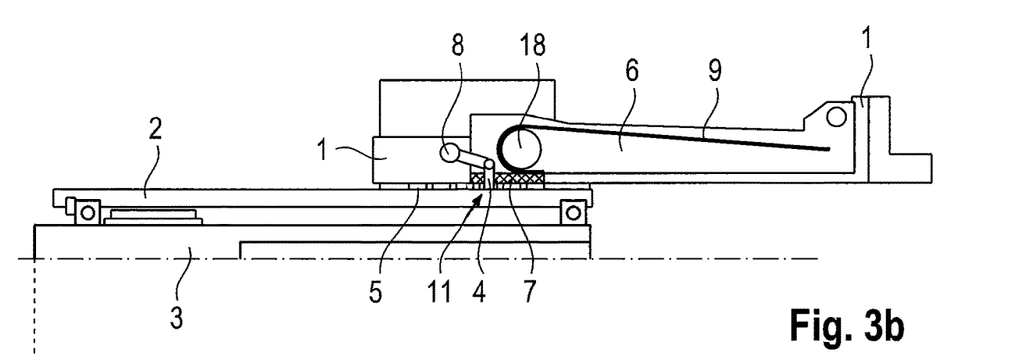
Figure 3C:
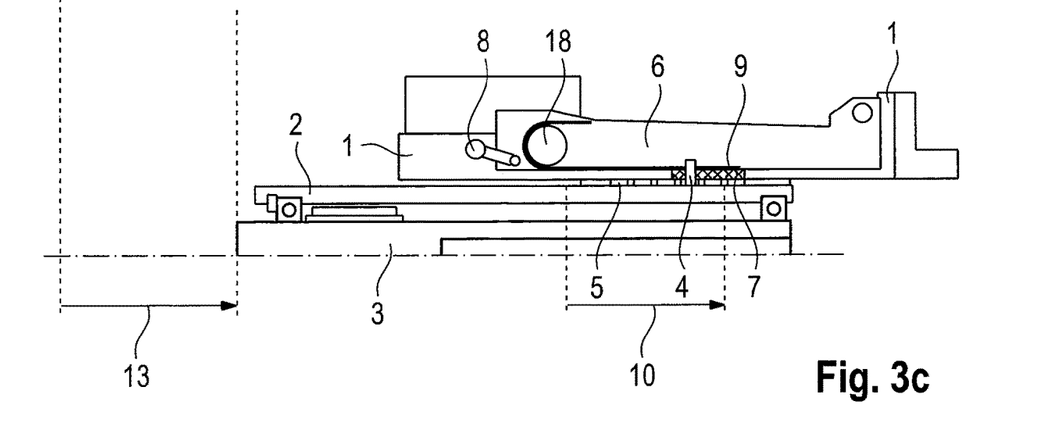

As shown in FIGS. 1 to 3, a first exemplary embodiment of the adjustable steering column includes a console unit 1 that is to be firmly mounted to the vehicle. As an alternative, the console unit may also be articulated to the vehicle in order to allow a height adjustment of the steering wheel. For the purpose of adjusting the axial length of the steering column to match the seating position of the driver, an axially displaceable steering shaft bearing unit 2 is mounted in the console unit 1, the terms "axial" and "radial" hereinafter referring to an axis of rotation of the steering wheel and the steering shaft 3.

A mechanism for adjusting the length of the steering column and fixing it in place is mounted to the console unit 1 and includes a locking component 4 which, during a driving operation (FIG. 3b), engages in at least one form-fitting element 5 of an arrangement of a plurality of such form-fitting elements 5 on the steering shaft bearing unit 2. Preferably, these form-fitting elements 5 are openings, as are shown in the figures.

As shown in FIG. 3a, for adjusting the length of the steering, an engagement of the locking component 4 in the form-fitting elements 5 of the steering shaft bearing unit 2 is enabled by the locking component 4 being adjusted substantially radially; then, the steering shaft 3 along with the steering wheel and the steering shaft bearing unit 2 can easily be shifted axially to a different engagement position. That is, the mechanism for adjusting the axial length of the steering column is in an open condition.

The steering column further includes an energy absorbing unit 6 which is designed and dimensioned such that in the event of a crash and more particularly in the event of a rear-end collision, it is able to absorb at least part of the kinetic energy of the driver hitting the steering wheel, in order to reduce the risk of injury to the driver.

To this end, the energy absorbing unit 6 includes an energy absorption element 9 having a load introduction section 7, the energy absorption element absorbing a force along a distance 10 for the purpose of energy absorption.

Figure 4:
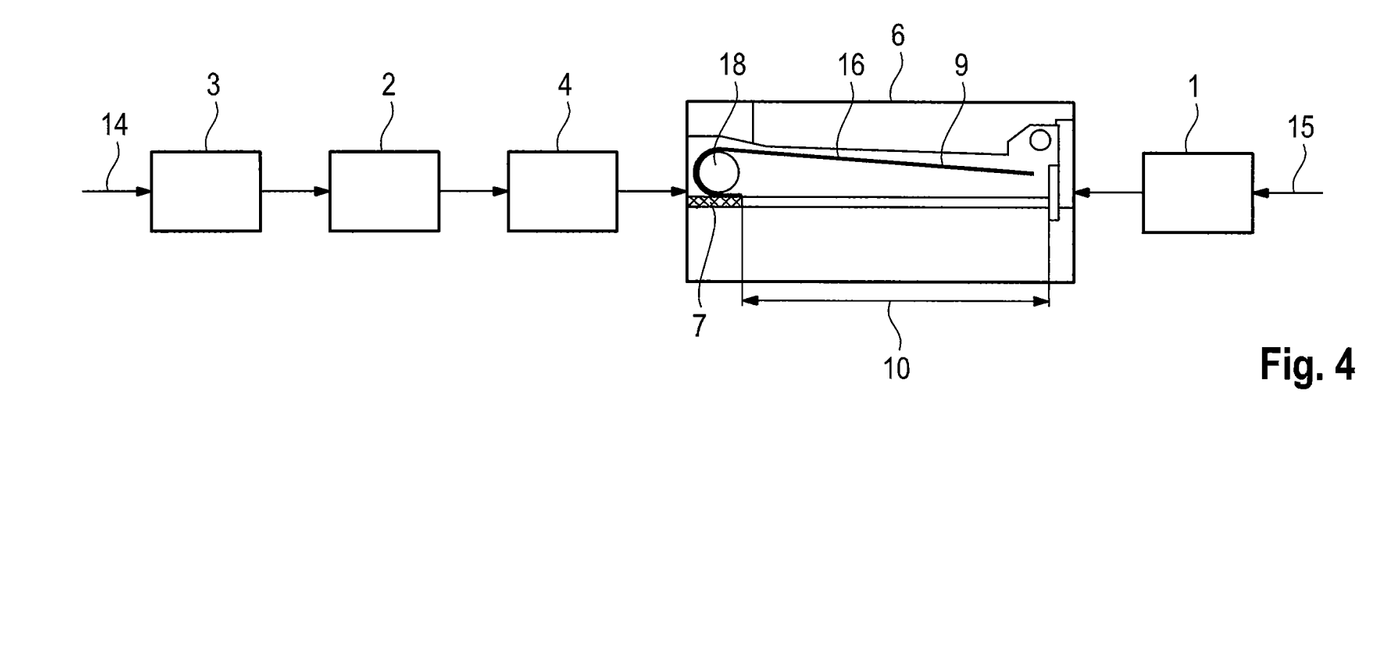
FIG. 4 shows a schematic illustration of the flow of force in the event of a crash.

FIG. 4 illustrates the flow of force occurring in the process. The energy absorbing unit 6 is mounted to the console unit 1 such that in the event of a crash, an axial force (action 14) can be transmitted in a form-fitting manner from the steering wheel with the steering shaft 3 to the steering shaft bearing unit 2, from there to the locking component 4 and, finally, from there to the load introduction section 7 of the energy absorbing unit 6. The counteracting force (reaction 15) acts from the body of the vehicle via the console unit 1 on the attachment of the energy absorbing unit 6 to the console unit 1.

The energy absorbing unit 6 may be formed in a wide range of designs as desired. For example, as an energy absorption element 9, it may have a bending tab (cf. FIG. 4), which is intended to be plastically deformed in the event of a crash. Other embodiments provide a tear tab or a tab bending at break, made of metal, in particular of steel. In any case, in the event of a crash, the load introduction section 7 needs to be moved along a distance 10 in order to simultaneously absorb the energy provided (force times distance), which is then converted into heat when the energy absorption element 9 is deformed. To this end, the energy absorption element 9 is axially coupled to the locking component 4 in a locked condition of the mechanism for adjusting the axial length of the steering column (cf. FIGS. 3b and 3c).

In the first exemplary embodiment of the invention (FIG. 3), the locking component 4 and the load introduction section 7 are in the form of two separate and separately acting components. FIG. 3a shows the locking component 4 in an opening position; by means of a lever 8, it can be brought to a locking position for driving operation according to FIG. 3b, in which it engages in a form-fitting element 5 in the steering shaft bearing unit 2. For this purpose, a radial guide 11 mounted to the console unit 1 is provided as an axial coupling of the locking component 4, the radial guide ensuring that an axial force which acts on the steering wheel and the steering shaft 3 and the amount of which is below the crash threshold can not cause an axial displacement of the steering wheel, the steering shaft 3 and the steering shaft bearing unit 2. To this end, the load introduction section 7, which is in the form of the guide 11, of the energy absorption element 9 has an opening through which the locking component 4 extends and in which it is radially displaceably guided.

Before occurrence of a crash (FIG. 3b), the load introduction section 7 thus serves as a radial guide 11, and the locking component 4 is releasably connected to the mechanism for adjusting the axial length of the steering column.

In the event of a crash, the force acting on the load introduction section 7 reaches such a high value that the latter will move axially along the distance 10, causing the energy absorbing process to occur. Upon such an axial displacement of the steering shaft bearing unit relative to the console unit in the locked condition of the mechanism for adjusting the axial length of the steering column, the locking component 4 detaches itself from the mechanism for adjusting the axial length of the steering column. The energy absorption element 9, which is designed as a bending tab, is pulled over a deflecting pin 18 and deformed plastically for energy absorption.

FIG. 3c shows the resultant situation after a crash. The load introduction section 7 is now no longer in its initial position at the energy absorbing unit 6, but has been displaced axially for the purpose of force transmission. The steering wheel (on the left in FIG. 3, not shown), the steering shaft 3 and the steering shaft bearing unit 2 also have been displaced in relation to the console unit 1 by the distance indicated as an arrow 13 in FIG. 3c, due to the driver hitting the steering wheel.

During this process, the locking component 4 has remained in engagement with the steering shaft bearing unit 2 and has transferred a force to the load introduction section 7 in a form-fitting manner. This has initiated the desired energy absorbing deformation of the energy absorption element 9.

Figure 5A:
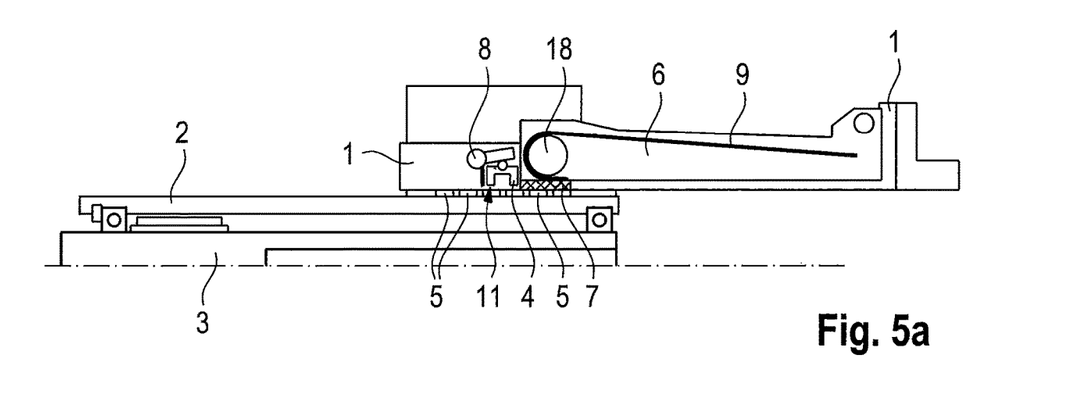
FIGS. 5a to 5c show schematic diagrams of a second exemplary embodiment of an adjustable steering column for a motor vehicle according to the invention.
Figure 5B:
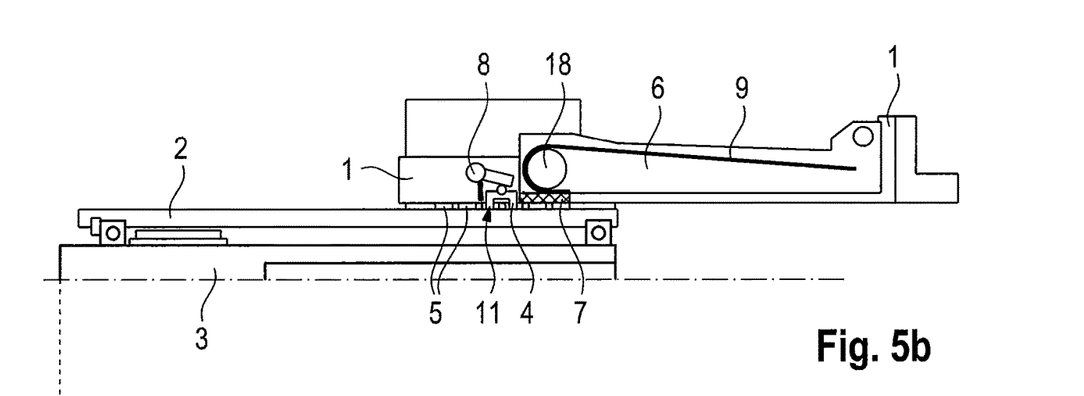
Figure 5C:
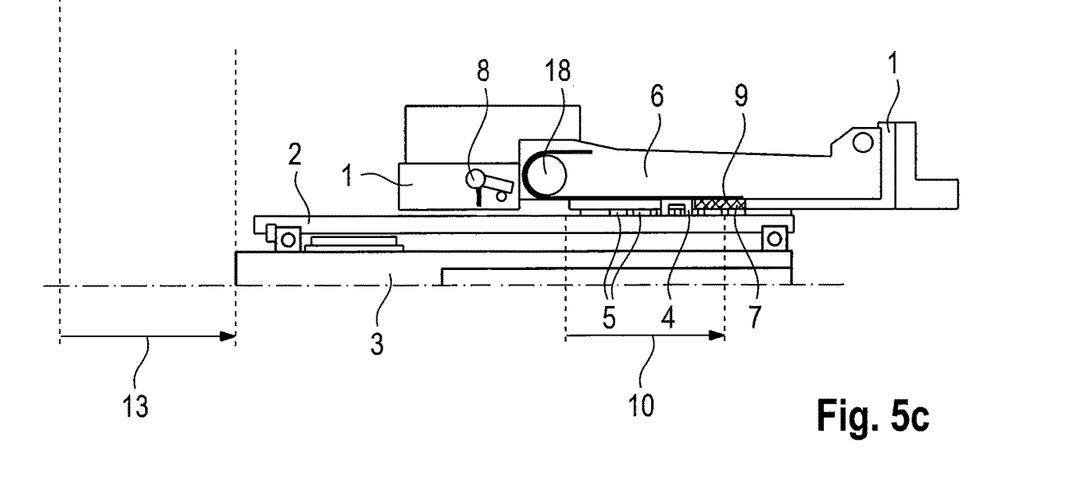

FIG. 5 shows a second exemplary embodiment of the invention, which differs from the exemplary embodiment according to FIG. 3 only in that the locking component 4 engages in two or more form-fitting elements 5, formed as openings, of the steering shaft bearing unit 2, which allows a safer force transmission. To this end, the openings should preferably be arranged to be equidistant.

In contrast to the first exemplary embodiment, the load introduction section 7 of the energy absorption element 9 includes a stop surface, rather than an opening for guiding the locking component 4, with the locking component 4 being axially adjacent to this stop surface in the locked condition of the mechanism for adjusting the axial length of the steering column.

Figure 6A:
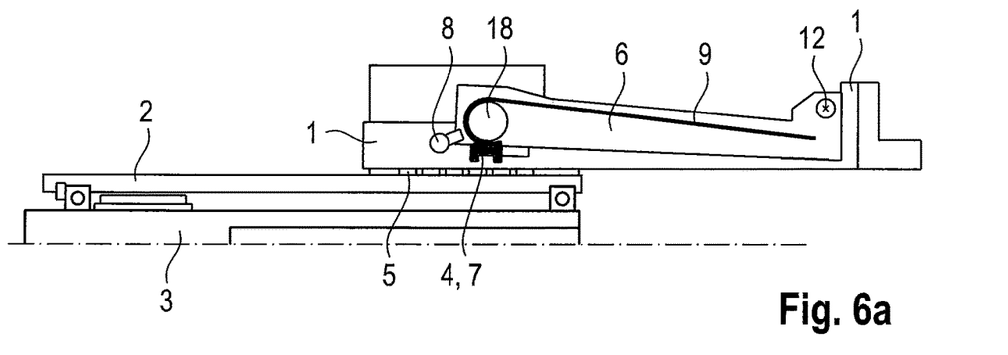
FIGS. 6a to 6c show schematic diagrams of a third exemplary embodiment of an adjustable steering column for a motor vehicle according to the invention.
Figure 6B:
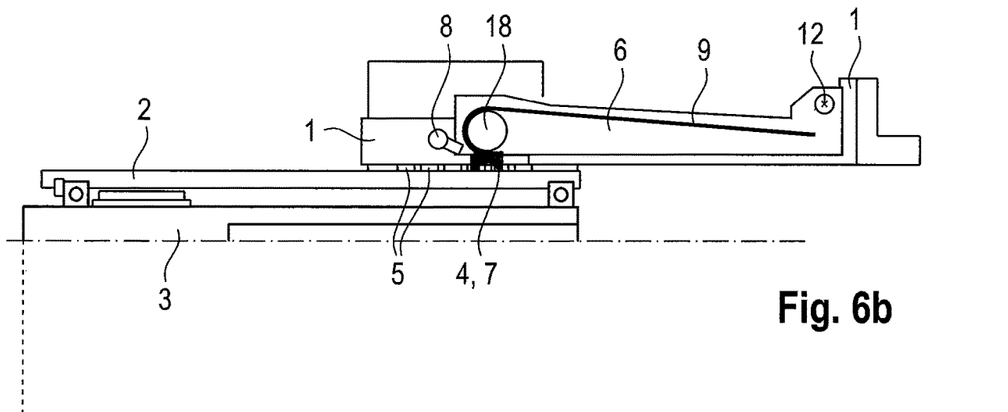
Figure 6C:
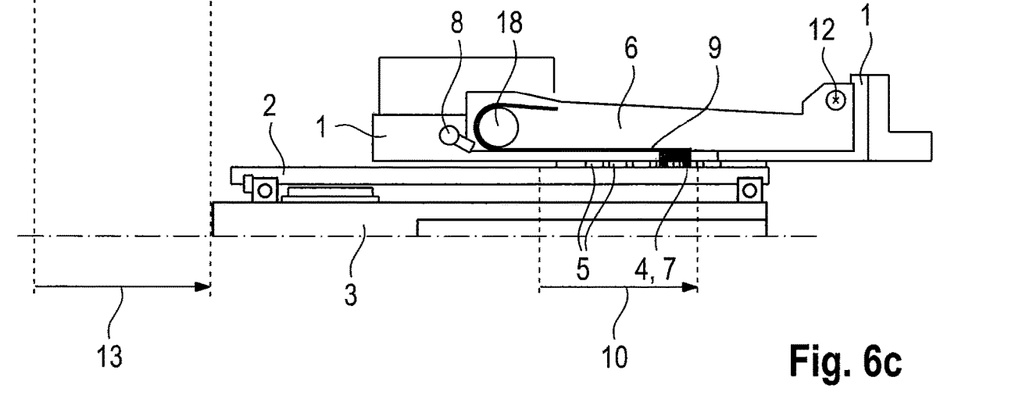

FIG. 6 shows a third exemplary embodiment of the invention. Here, the load introduction section 7 of the energy absorbing unit 6 and the locking component 4 of the mechanism for adjusting the length of the steering column are formed in one piece, i.e. as one single component so that, unlike in the first and second embodiments of the steering column, this unitary component (only reference number 7 will be used therefor below) assumes both functions at the same time. To achieve this, according to FIG. 6a, for the purpose of adjusting the length of the steering column, the energy absorbing unit 6 is mounted to the console unit 1 for swiveling about a swivel axis 12 such that during driving operation (FIG. 6b), the load introduction section 7 is in direct engagement with at least one of the form-fitting elements 5 in the steering shaft bearing unit 2 and is disengaged for adjusting the length of the steering column (FIG. 6a).

For adjusting and fixing in place the length of the steering column, the console unit 1 includes a manually operated lever 8 in the third embodiment as well, with the aid of which, however, the energy absorbing unit 6 is now swiveled about the swivel axis 12 until the load introduction section 7 is disengaged from the form-fitting elements 5 of the steering shaft bearing unit 2 (FIG. 6a) or engages therein (FIG. 6b).

In the present third exemplary embodiment, after a crash event the situation arises as is illustrated in FIG. 6c. The flow of force during the crash is the same here as that illustrated in FIG. 4 for the other embodiments, except that the components 4 and 7 now constitute one single, common component.

In addition to an end stop for the reduction in length of the steering column, which limits the possible displacement of the steering shaft bearing unit 2 with the steering shaft 3 in the event of a crash, the energy absorbing unit 6 may also include an end stop for the load introduction section 7. This end stop comes into play when the crash occurs with the steering wheel being in a position in which it has been pulled out far, and has the advantageous effect that the steering wheel can then not move forward any further and accelerate again when the energy absorbing unit 6 has absorbed its maximum energy.

A safety mechanism that allows a driving operation only in the engaged position of the locking component 4 and a supplementary arrangement for swiveling the steering column are also of advantage.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An adjustable steering column for a motor vehicle, comprising
    a console unit which is vehicle-fixed or articulated to the vehicle;
    a steering shaft bearing unit which is arranged in the console unit and is axially displaceable relative to the console unit;
    a mechanism mounted to the console unit and provided for adjusting an axial length of the steering column, the mechanism, when in an open condition, enabling an axial relative displacement between the console unit and the steering shaft bearing unit and, when in a locked condition, axially fixing the steering shaft bearing unit in place at the console unit, and
    an energy absorbing unit which, in the locked condition of the mechanism for adjusting the axial length of the steering column, allows an axial displacement of the steering shaft bearing unit relative to the console unit, accompanied by an absorption of energy,
    wherein the energy absorbing unit is mounted to the console unit,
    wherein the steering shaft bearing unit includes form-fitting elements, and the mechanism for adjusting the axial length of the steering column includes an adjustable locking component, which in the locked condition of the mechanism for adjusting the axial length of the steering column engages in a form-fitting manner in at least one form-fitting element of the steering shaft bearing unit,
    wherein the energy absorbing unit includes an energy absorption element having a load introduction section, the energy absorption element being axially coupled to the locking component in the locked condition of the mechanism for adjusting the axial length of the steering column, and
    wherein the load introduction section of the energy absorption element has an opening, the locking component extending through the opening and being radially displaceably guided in the opening.

2. The adjustable steering column according to claim 1, wherein the mechanism for adjusting the axial length of the steering column includes a manually operated lever by means of which the locking component is adjustable between an opening position and a locking position.

3. The adjustable steering column according to claim 1, wherein the energy absorbing unit is mounted to the console unit for swiveling about a swivel axis.

4. The adjustable steering column according to claim 1, wherein the locking component is formed in one piece with the load introduction section of the energy absorption element.

5. The adjustable steering column according to claim 1, wherein the energy absorbing unit is rigidly connected to the console unit.

6. The adjustable steering column according to claim 1, wherein the load introduction section of the energy absorption element has a stop surface, the locking component being axially adjacent to the stop surface in the locked condition of the mechanism for adjusting the axial length of the steering column.

7. The adjustable steering column according to claim 1, wherein the energy absorbing unit includes an end stop for the energy absorption element, the end stop, in the locked condition of the mechanism for adjusting the axial length of the steering column, limiting an axial distance that is covered by the energy absorption element and, along with the energy absorption element, by the steering shaft bearing unit.

8. The adjustable steering column according to claim 7, wherein the console unit includes an end stop for the axial movement of the steering shaft bearing unit, the end stop, in the locked condition of the mechanism for adjusting the axial length of the steering column, limiting the axial distance that is covered by the energy absorption element and, along with the energy absorption element, by the steering shaft bearing unit.

9. The adjustable steering column according to claim 1, having a safety mechanism which permits a driving operation of the motor vehicle only in the locked condition of the mechanism for adjusting the axial length of the steering column.

10. The adjustable steering column according to claim 1, having a supplementary arrangement for swiveling the steering column.

11. An adjustable steering column for a motor vehicle, comprising
   a console unit which is vehicle-fixed or articulated to the vehicle;
   a steering shaft bearing unit which is arranged in the console unit and is axially displaceable relative to the console unit;
   a mechanism mounted to the console unit and provided for adjusting an axial length of the steering column, the mechanism, when in an open condition, enabling an axial relative displacement between the console unit and the steering shaft bearing unit and, when in a locked condition, axially fixing the steering shaft bearing unit in place at the console unit, and
   an energy absorbing unit which, in the locked condition of the mechanism for adjusting the axial length of the steering column, allows an axial displacement of the steering shaft bearing unit relative to the console unit, accompanied by an absorption of energy,
   wherein the energy absorbing unit is mounted to the console unit,
   wherein the steering shaft bearing unit includes form-fitting elements, and the mechanism for adjusting the axial length of the steering column includes an adjustable locking component, which in the locked condition of the mechanism for adjusting the axial length of the steering column engages in a form-fitting manner in at least one form-fitting element of the steering shaft bearing unit,
   wherein the energy absorbing unit includes an energy absorption element having a load introduction section, the energy absorption element being axially coupled to the locking component in the locked condition of the mechanism for adjusting the axial length of the steering column,
   wherein the load introduction section of the energy absorption element has an opening, the locking component extending through the opening and being radially displaceably guided in the opening, and
   wherein the locking component is releasably connected to the mechanism for adjusting the axial length of the steering column.

12. An adjustable steering column for a motor vehicle, comprising
   a console unit which is vehicle-fixed or articulated to the vehicle;
   a steering shaft bearing unit which is arranged in the console unit and is axially displaceable relative to the console unit;
   a mechanism mounted to the console unit and provided for adjusting an axial length of the steering column, the mechanism, when in an open condition, enabling an axial relative displacement between the console unit and the steering shaft bearing unit and, when in a locked condition, axially fixing the steering shaft bearing unit in place at the console unit, and
   an energy absorbing unit which, in the locked condition of the mechanism for adjusting the axial length of the steering column, allows an axial displacement of the steering shaft bearing unit relative to the console unit, accompanied by an absorption of energy,
   wherein the energy absorbing unit is mounted to the console unit,
   wherein the steering shaft bearing unit includes form-fitting elements, and the mechanism for adjusting the axial length of the steering column includes an adjustable locking component, which in the locked condition of the mechanism for adjusting the axial length of the steering column engages in a form-fitting manner in at least one form-fitting element of the steering shaft bearing unit,
   wherein the energy absorbing unit includes an energy absorption element having a load introduction section, the energy absorption element being axially coupled to the locking component in the locked condition of the mechanism for adjusting the axial length of the steering column,
   wherein the energy absorbing unit is mounted to the console unit for swiveling about a swivel axis,
   wherein the adjustable locking component and the load introduction section of the energy absorbing element are formed of one unity piece, and
   wherein the energy absorbing unit includes an end stop for the energy absorption element, the end stop, in the locked condition of the mechanism for adjusting the axial length of the steering column, limiting an axial distance that is covered by the energy absorption element and, along with it, by the steering shaft bearing unit.

* * * * *